US009060091B2

(12) United States Patent
Horie

(10) Patent No.: US 9,060,091 B2
(45) Date of Patent: Jun. 16, 2015

(54) IMAGE PROCESSING APPARATUS, IMAGE PROCESSING METHOD, AND COMPUTER-READABLE MEDIUM

(71) Applicant: FUJI XEROX CO., LTD., Minato-ku, Tokyo (JP)

(72) Inventor: Daigo Horie, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 8 days.

(21) Appl. No.: 13/914,022

(22) Filed: Jun. 10, 2013

(65) Prior Publication Data
US 2014/0176974 A1  Jun. 26, 2014

(30) Foreign Application Priority Data

Dec. 21, 2012 (JP) ................... 2012-280069

(51) Int. Cl.
*H04N 1/00* (2006.01)
*H04N 1/32* (2006.01)

(52) U.S. Cl.
CPC .... *H04N 1/00954* (2013.01); *H04N 2201/3298* (2013.01); *H04N 1/32358* (2013.01); *H04N 2201/0094* (2013.01)

(58) Field of Classification Search
CPC ....................................................... H04N 1/21
USPC .................................. 358/1.1–1.9, 1.11–1.18
See application file for complete search history.

(56) References Cited

U.S. PATENT DOCUMENTS

| 3,725,871 | A * | 4/1973 | Heuttner et al. ............... 710/109 |
| 5,719,582 | A * | 2/1998 | Gray ............................. 342/120 |
| 2004/0180722 | A1* | 9/2004 | Giobbi ........................... 463/42 |
| 2009/0276574 | A1* | 11/2009 | Takai et al. ................... 711/118 |
| 2010/0002270 | A1* | 1/2010 | Suzuki .......................... 358/444 |
| 2010/0265544 | A1* | 10/2010 | Anezaki et al. .............. 358/1.15 |

FOREIGN PATENT DOCUMENTS

JP      2009-020609 A     1/2009

* cited by examiner

*Primary Examiner* — King Poon
*Assistant Examiner* — Ibrahim Siddo
(74) *Attorney, Agent, or Firm* — Sughrue Mion, PLLC

(57) ABSTRACT

An image processing apparatus includes a storage and a controller. The storage stores an additional program having an interface for switching processing using first-choice hardware to processing using an alternative to the first-choice hardware depending on usage of the first-choice hardware. In the case where processing related to the additional program is executed, the controller executes the processing related to the additional program on image data by using the first-choice hardware or the alternative depending on the usage of the first-choice hardware.

19 Claims, 6 Drawing Sheets

FIG. 2

```
interface transferable {
    int init();
    int sendfile();      ··· FUNCTION OF PASSING DATA BY USING FILE
    int sendbuffer();    ··· FUNCTION OF PASSING DATA BY USING MEMORY
    int end();
}
```

FIG. 5

```
interface imageprocess {
    int init();
    int sw_process();    ··· FUNCTION OF PERFORMING IMAGE PROCESSING
                             THROUGH SOFTWARE
    int hw_process();    ··· FUNCTION OF PERFORMING IMAGE PROCESSING
                             THROUGH HARDWARE
    int end();
}
```

IMAGE PROCESSING APPARATUS, IMAGE PROCESSING METHOD, AND COMPUTER-READABLE MEDIUM

CROSS-REFERENCE TO RELATED APPLICATIONS

This application is based on and claims priority under 35 USC 119 from Japanese Patent Application No. 2012-280069 filed Dec. 21, 2012.

BACKGROUND (i) Technical Field

The present invention relates to an image processing apparatus, an image processing method, and a computer-readable medium.

(ii) Related Art

In image processing apparatuses, programs related to image processing, such as programs related to a print function, programs related to a scanning function, programs related to a copy function, and programs related to a facsimile function, are installed in advance. Further, by installing programs, such as programs for image data transfer and programs for image data compression, as additional programs in image processing apparatuses, the image processing apparatuses may have optional functions. The programs added to image processing apparatuses may be called plug-ins.

SUMMARY

According to an aspect of the present invention, there is provided an image processing apparatus including a storage and a controller. The storage stores an additional program having an interface for switching processing using first-choice hardware to processing using an alternative to the first-choice hardware depending on usage of the first-choice hardware. In the case where processing related to the additional program is executed, the controller executes the processing related to the additional program on image data by using the first-choice hardware or the alternative depending on the usage of the first-choice hardware.

BRIEF DESCRIPTION OF THE DRAWINGS

Exemplary embodiments of the present invention will be described in detail based on the following figures, wherein:

FIG. 2 is a diagram for describing an interface of a plug-in according to the first exemplary embodiment;

FIG. 5 is a diagram for describing an interface of a plug-in according to the second exemplary embodiment.

DETAILED DESCRIPTION

First Exemplary Embodiment

Figure 1:
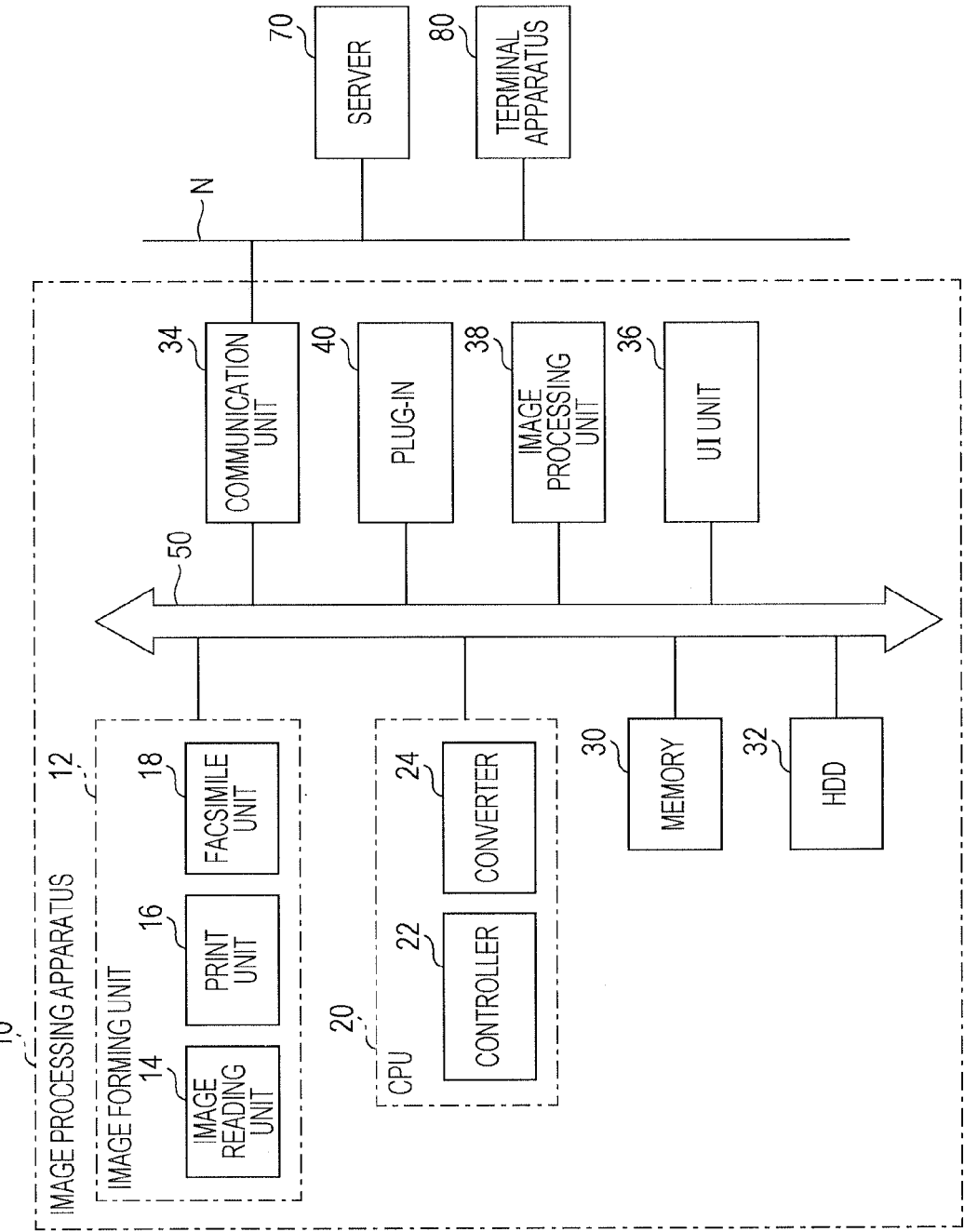
FIG. 1 is a block diagram illustrating an exemplary image processing system according to a first exemplary embodiment of the present invention.

FIG. 1 illustrates an exemplary image processing system according to a first exemplary embodiment of the present invention. The image processing system according to the first exemplary embodiment includes an image processing apparatus 10, a server 70, and a terminal apparatus 80. The image processing apparatus 10, the server 70, and the terminal apparatus 80 are connected to each other via a communication path N such as a network. The server 70 is installed, for example, on a cloud. In the example in FIG. 1, one server 70 and one terminal apparatus 80 are illustrated. However, multiple servers 70 and multiple terminal apparatuses 80 may be connected to the communication path N.

The image processing apparatus 10 is provided with a scanning function of scanning the image on a document and converting the scanned image into electronic image data. The image processing apparatus 10 may be also provided with at least one of image forming functions, such as a print function of printing received data, a copy function of copying the image on a document onto paper, and a facsimile function of transmitting an image by using a facsimile. The image processing apparatus 10 may be further provided with various functions, such as a function of downloading image data stored in the server 70 and a function of printing downloaded image data. However, the image processing apparatus 10 is not limited to these. For example, a scanner provided with no print functions may be included in the category of the image processing apparatus 10 according to the first exemplary embodiment.

For example, the image processing apparatus 10 includes an image forming unit 12, a central processing unit (CPU) 20, a memory 30, a hard disk drive (HDD) 32, a communication unit 34, a user interface unit (UI unit) 36, an image processing unit 38, a plug-in 40, and a bus 50. The units of the image processing apparatus 10 are connected to the bus 50.

For example, the image forming unit 12 includes an image reading unit 14, a print unit 16, and a facsimile unit 18. The image reading unit 14 scans the image on a document so as to generate image data representing the image. The print unit 16 prints an image on paper. The facsimile unit 18 transmits an image by using a facsimile.

The CPU 20 controls operations of the units of the image processing apparatus 10. The memory 30 is constituted by, for example, a random access memory (RAM), and stores, for example, various types of program, control data, and image data. The memory 30 has a data transfer rate faster than that of the HDD 32. The HDD 32 stores, for example, various types of program, control data, and image data. For example, the CPU 20 executes the programs, thereby performing functions of the units of the image processing apparatus 10.

The communication unit 34 is, for example, a network interface, and connects the image processing apparatus 10 to the communication path N, enabling data transmission to the server 70 and the terminal apparatus 80 and also enabling data reception from the server 70 and the terminal apparatus 80.

The UI unit 36 is provided with, for example, an input device and a display, and receives inputs of various types of information from a user and displays a screen about image formation. For example, the UI unit 36 receives inputs of various types of parameter used when a document is scanned using the image reading unit 14. In addition, the UI unit 36 receives various types of setting information used when image data generated through scanning is transferred to an external apparatus.

The image processing unit 38 subjects image data generated through scanning or image data received from an external apparatus to image processing, such as gamma correction, filtering, gradation processing, and compression. The image processing unit 38 may be achieved by using image processing software, or may be achieved by using image-processing dedicated hardware.

The plug-in 40 is a set of programs added to the image processing apparatus 10, and is stored in, for example, the memory 30 or the HDD 32. The plug-in 40 is, for example, a program which is for extending the scanning function of the image processing apparatus 10 and which causes image data generated through scanning to be transferred to an external apparatus, such as the server 70 or the terminal apparatus 80, via the communication path N. The plug-in 40 is installed in the image processing apparatus 10, for example, through a recording medium, such as a compact disk (CD) or a digital versatile disk (DVD), or through the communication path N, and is stored in the memory 30 or the HDD 32.

The plug-in 40 is described (implemented) by using, for example, a programming language such as Java™, and is provided (implemented) with interfaces for passing/receiving data. For example, the plug-in 40 has an interface for switching processing using the first-choice hardware to processing using an alternative depending on the usage of the first-choice hardware. FIG. 2 illustrates an exemplary interface of the plug-in 40. For example, the plug-in 40 has an interface for passing/receiving data via the memory 30 and an interface for passing/receiving data via the HDD 32. For example, the memory 30 corresponds to the first-choice hardware, and the HDD 32 corresponds to an alternative. In FIG. 2, "sendfile( )" is a function of passing/receiving data via the HDD 32 by using the data as a file, whereas "sendbuffer( )" is a function of passing/receiving data via the memory 30.

The image processing apparatus 10 includes a controller 22 and a converter 24. When the controller 22 executes the plug-in 40, the controller 22 uses the first-choice hardware or the alternative depending on the usage of the first-choice hardware so as to perform processing according to the plug-in 40 on image data. For example, the controller 22 stores image data generated through scanning in the memory 30 or the HDD 32 depending on the free space of the memory 30 corresponding to the first-choice hardware. Then, the controller 22 executes the plug-in 40 to transfer the image data stored in the memory 30 or the HDD 32 to an external apparatus. For example, when the data capacity required for transfer of the image data is available in the memory 30 (when the free space of the memory 30 is sufficient), the controller 22 transfers the image data via the memory 30 to an external apparatus. When the data capacity required for transfer of the image data is not available in the memory 30 (when the free space of the memory 30 is insufficient), the controller 22 transfers the image data via the HDD 32 to an external apparatus. More specifically, when the free space of the memory 30 is equal to or more than a predetermined threshold, the controller 22 stores image data generated through scanning in the memory 30, and executes the plug-in 40 so as to transfer the image data stored in the memory 30 via the communication unit 34 and the communication path N to an external apparatus. When the free space of the memory 30 is less than the predetermined threshold, the controller 22 stores image data generated through scanning in the HDD 32, and executes the plug-in 40 so as to transfer the image data stored in the HDD 32 via the communication unit 34 and the communication path N to an external apparatus. Even when the free space of the memory 30 is less than the amount of image data to be transferred, the controller 22 may gradually store the image data in the memory 30, and at the same time, may gradually transfer the image data stored in the memory 30 to an external apparatus.

The converter 24 converts the format of image data generated through scanning into any format, such as Portable Document Format (PDF), XML Paper Specification (XPS), or Joint Photographic Experts Group (JPEG). For example, a user may specify the format type by using the UI unit 36.

Figure 3:
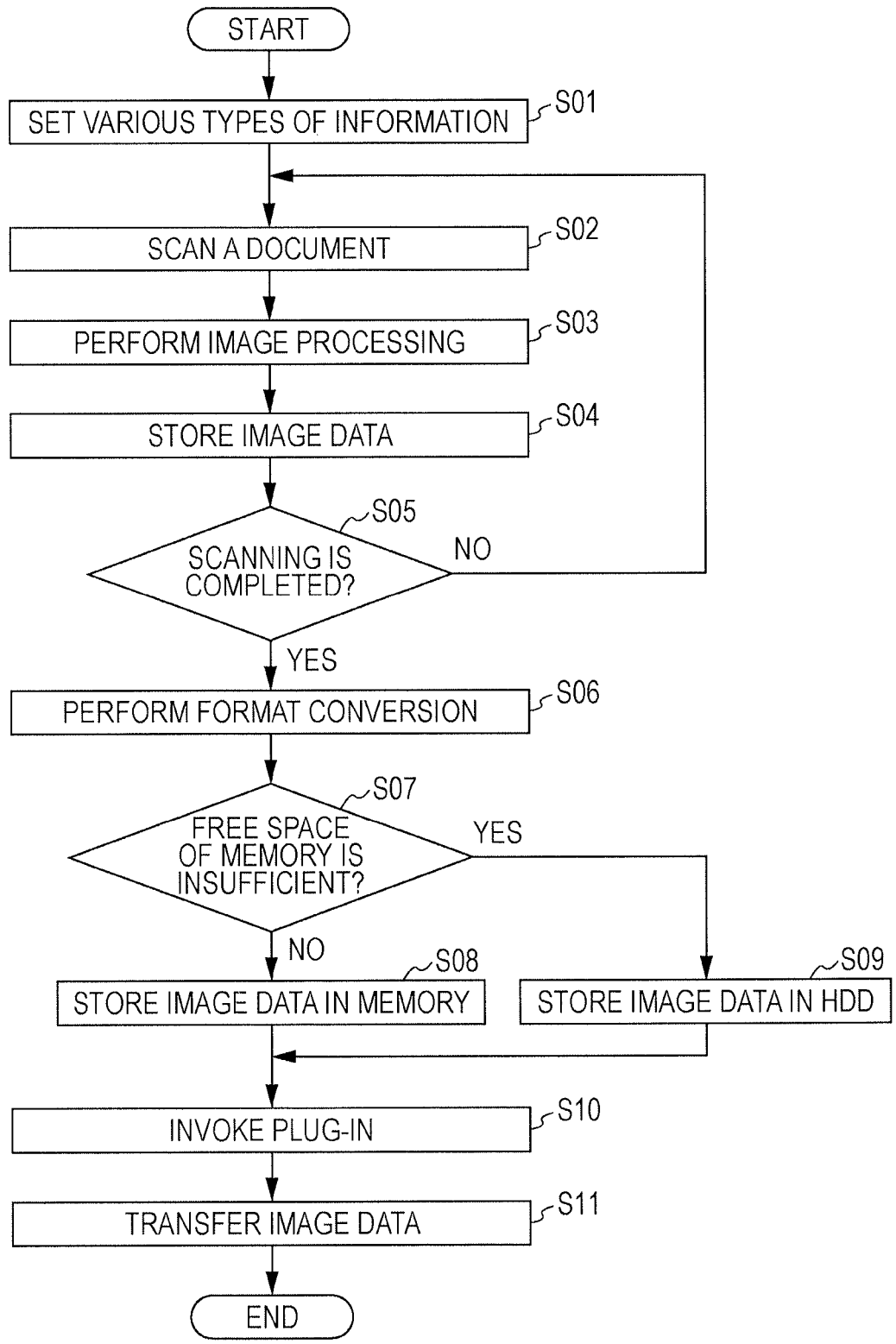
FIG. 3 is a flowchart of an exemplary operation of an image processing apparatus according to the first exemplary embodiment.

A process of transferring image data generated through scanning will be described with reference to the flowchart in FIG. 3.

A user uses the UI unit 36 to input information, such as the image format type and the destination of transfer of image data, and transmits an instruction to start scanning (in step S01). This causes the image reading unit 14 to scan a document (in step S02). For example, the image reading unit 14 scans a document constituted by multiple pages, and generates image data for each page. The image processing unit 38 performs image processing on the image data generated through scanning (in step S03). The CPU 20 adds a file name to the image data obtained through image processing, and temporarily stores the image data in the HDD 32 (in step S04). If the image reading unit 14 scans all pages (YES in step S05), the scanning is completed. Then, the converter 24 reads out the image data from the HDD 32, and converts the format of the read-out image data into the format specified by the user (in step S06). If pages which have not been scanned are left (NO in step S05), steps S02 to S04 are performed on the pages which have not been scanned.

When all of the pages are scanned and the format of the image data is converted, the controller 22 checks the free space of the memory 30 (in step S07). If the free space of the memory 30 is sufficient (NO in step S07), the controller 22 stores the image data whose format has been converted in the memory 30 (in step S08). For example, if the free space of the memory 30 is equal to or more than the predetermined threshold, the controller 22 stores the image data in the memory 30. If the free space of the memory 30 is insufficient (YES in step S07), the controller 22 stores the image data whose format has been converted in the HDD 32 (in step S09). For example, if the free space of the memory 30 is less than the predetermined threshold, the controller 22 stores the image data in the HDD 32.

The controller 22 invokes the plug-in 40 (in step S10). Description will be made with reference to FIG. 2. If the free space of the memory 30 is sufficient, the controller 22 invokes the functions of plug-in 40, which are init( ), sendbuffer( ), and end( ), in this sequence. Thus, the controller 22 executes the plug-in 40, causing the image data stored in the memory 30 to be transferred via the communication unit 34 and the communication path N to the external apparatus specified by the user (in step S11). If the free space of the memory 30 is insufficient, the controller 22 invokes the functions of the plug-in 40, which are init( ), sendfile( ), and end( ), in this sequence. Thus, the controller 22 executes the plug-in 40, causing the image data stored in the HDD 32 to be transferred via the communication unit 34 and the communication path N to the external apparatus specified by the user (in step S11).

As described above, in the image processing apparatus 10 according to the first exemplary embodiment, in the case where the plug-in 40 is executed to transfer image data to an external apparatus, even when the free space of the memory 30 which is the first-choice hardware to be used for the transfer is insufficient, the HDD 32 serving as an alternative is used to perform the transfer, whereby the transfer is smoothly performed. If insufficient free space of the memory 30 causes the transfer to wait, the processing including the transfer may be delayed, causing a user to wait. In contrast, the image processing apparatus 10 according to the first exemplary embodiment achieves smooth transfer.

For example, the larger the number of plug-ins added to the image processing apparatus 10 in order to extend the functions of the image processing apparatus 10 is, the smaller the free space of the memory 30 is. As a result, the free space of the memory 30 may be insufficient when image data is to be transferred. Typically, a more highly functional plug-in has a tendency to increase a consumption of the memory 30. Therefore, the free space of the memory 30 may be insufficient when image data is to be transferred. The image processing apparatus 10 according to the first exemplary embodiment uses the HDD 32 serving as an alternative to transfer image data, achieving smooth transfer even when the free space of the memory 30 is insufficient.

Alternatively, a limit may be set in advance for the memory consumption caused by a plug-in, and a plug-in which operates within the limit may be developed and installed in the image processing apparatus 10. However, in addition to plus-ins developed by the manufacturer of the image processing apparatus 10, plug-ins developed by other software developers may be installed and used in the image processing apparatus 10. In this case, plug-ins which consume the memory to a degree exceeding the predetermined limit may be installed in the image processing apparatus 10, causing the free space of the memory 30 to become insufficient. Even in this case, the image processing apparatus 10 according to the first exemplary embodiment uses the HDD 32 serving as an alternative so as to transfer image data, achieving smooth transfer.

The controller 22 may transfer image data via the memory 30 or the HDD 32 to an external apparatus depending on a user logging in the image processing apparatus 10. For example, priority as user authority may be given to users in advance. When a user having high priority is logging in the image processing apparatus 10, the controller 22 may transfer image data via the memory 30 to an external apparatus. When a user having low priority is logging in the image processing apparatus 10, the controller 22 may transfer image data via the HDD 32 to an external apparatus. Thus, image data is transferred by changing the transfer rate depending on a user. For example, when a user having high priority is logging in, image data is transferred at a rate higher than that used when a user having low priority is logging in. Thus, the memory 30 may be efficiently used by changing hardware used for the transfer depending on user authority.

For example, when a user logging in the image processing apparatus 10 has administrator authority, image data may be transferred via the memory 30. When a user logging in the image processing apparatus 10 does not have administrator authority, image data may be transferred via the HDD 32. In this case, a user uses the UI unit 36 to input authentication information, such as a user ID and a password, and logs in the image processing apparatus 10. The controller 22 performs authentication on the basis of the authentication information which is input from the UI unit 36. When the login user is authenticated as an administrator, image data is transferred via the memory 30 to an external apparatus. When a regular user having no administrator authority is logging in the image processing apparatus 10, the controller 22 transfers image data via the HDD 32 to an external apparatus. Thus, when an administrator is logging in, image data is transferred at a rate higher than that used for other users.

When the free space of the memory 30 is insufficient and the HDD 32 serving as an alternative is not included in the image processing apparatus 10, the controller 22 may cause the transfer to wait until the free space of the memory 30 becomes sufficient. When the free space of the memory 30 becomes sufficient, image data may be transferred via the memory 30 to an external apparatus. Thus, even in the case where the plug-in 40 which operates on the precondition that switching to an alternative is performed in response to the usage of the first-choice hardware is installed in the image processing apparatus 10, when the HDD 32 serving as an alternative is not included in the image processing apparatus 10, image data is transferred via the memory 30 serving as the first-choice hardware.

When the free space of the memory 30 is insufficient and the image processing apparatus 10 does not include the HDD 32 serving as an alternative, the controller 22 may stop scanning and transfer of image data, preventing delay of processing.

Second Exemplary Embodiment

Figure 4:
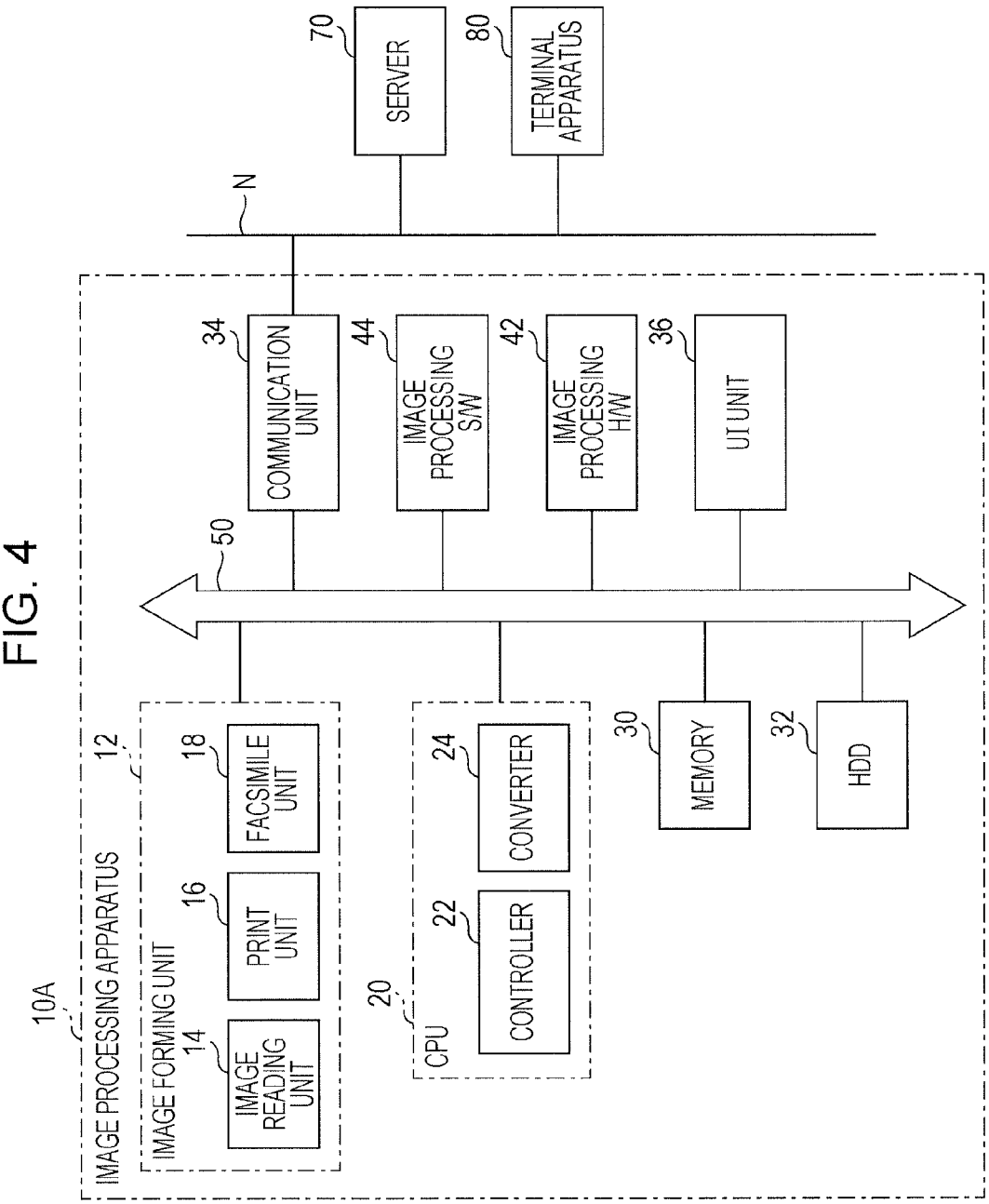
FIG. 4 is a block diagram illustrating an exemplary image processing system according to a second exemplary embodiment of the present invention.

An image processing apparatus according to a second exemplary embodiment will be described. FIG. 4 illustrates an exemplary image processing system according to the second exemplary embodiment. Similarly to the first exemplary embodiment, an image processing apparatus 10A according to the second exemplary embodiment is connected to the server 70 and the terminal apparatus 80 via the communication path N. The image processing apparatus 10A includes an image processing hardware (H/W) 42 instead of the image processing unit 38, and an image processing software (S/W) 44 instead of the plug-in 40. Features different from those in the first exemplary embodiment will be described below.

The image processing H/W 42 is dedicated hardware for subjecting image data generated through scanning or image data received from an external apparatus to image processing, such as gamma correction, filtering, gradation processing, and compression.

The image processing S/W 44 is a set of programs (plug-in) added to the image processing apparatus 10A, and is stored in, for example, the memory 30 or the HDD 32. The image processing S/W 44 is software for performing the same processing operations of image processing as at least some operations of the image processing performed by the image processing H/W 42. For example, the CPU 20 executes the image processing S/W 44, causing image data to be subjected to image processing, such as gamma correction, filtering, gradation processing, and compression. The image processing S/W 44 serving as a plug-in has an interface for switching processing using the first-choice hardware to processing using an alternative depending on the usage of the first-choice hardware. FIG. 5 illustrates an exemplary interface of the image processing S/W 44. For example, the image processing S/W 44 has an interface for performing image processing by using hardware, and an interface for performing image processing by using software. For example, the image processing H/W 42 corresponds to the first-choice hardware, and the image processing S/W 44 corresponds to software serving as an alternative. The function "sw_process( )" in FIG. 5 is a function of performing image processing by using software (i.e., the image processing S/W 44). The function "hw_process( )" is a function of performing image processing by using hardware (i.e., the image processing H/W 42).

The image processing H/W 42 is image-processing dedicated hardware. Therefore, the processing speed of the image processing H/W 42 is faster than that of the image processing S/W 44 which is software.

When the controller 22 performs image processing on image data, the controller 22 uses the image processing H/W 42 or the image processing S/W 44 depending on the usage of the image processing H/W 42 corresponding to the first-choice hardware. For example, when the image processing H/W 42 is not being used, the controller 22 controls the image processing H/W 42 so as to perform image processing on image data. When the image processing H/W 42 is being used, the controller 22 executes the image processing S/W 44 serving as a plug-in so as to perform image processing on image data.

Figure 6:
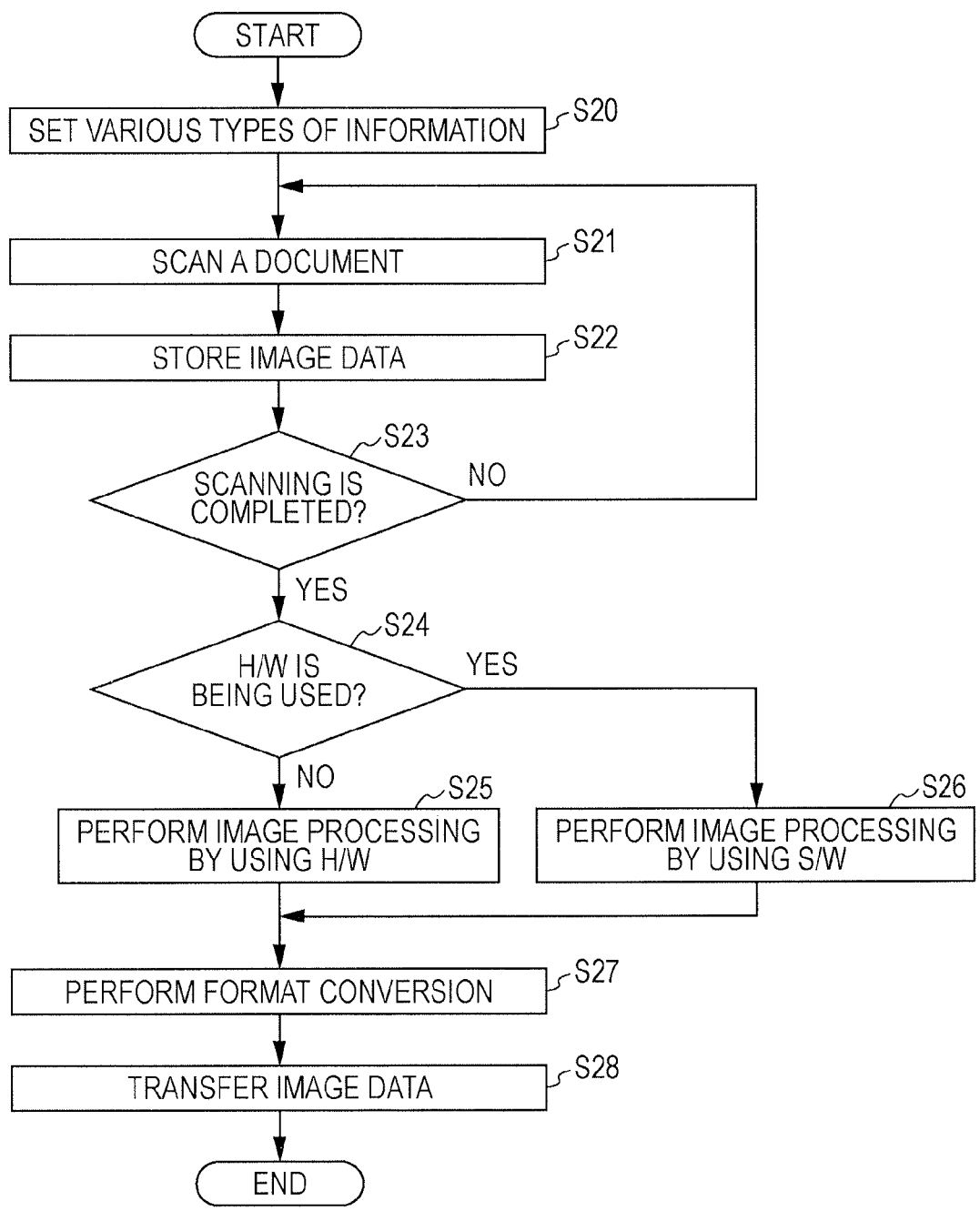
FIG. 6 is a flowchart of an exemplary operation of an image processing apparatus according to the second exemplary embodiment.

A process of performing image processing on image data generated through scanning will be described with reference to the flowchart in FIG. 6.

A user uses the UI unit 36 to input information, such as the image format type and the destination of transfer of image data, and transmits an instruction to start scanning (in step S20). This causes the image reading unit 14 to scan a document (in step S21). The CPU 20 adds a file name to the image data generated through scanning, and temporarily stores the image data in the HDD 32 (in step S22). The image data may be stored in the HDD 32 after the image data is subjected to predetermined image processing. If the image reading unit 14 has scanned all pages in a document (YES in step S23), the scanning is completed. If pages which have not been scanned are left (NO in step S23), steps S21 to S23 are performed on the pages which have not been scanned.

If all of the pages have been scanned, the controller 22 checks the usage of the image processing H/W 42 (in step S24). If the image processing H/W 42 is not being used (NO in step S24), the controller 22 invokes the interface for performing image processing by using hardware, and causes the image processing H/W 42 to perform image processing. Thus, the image processing H/W 42 performs predetermined image processing on the image data generated through scanning (in step S25). If the image processing H/W 42 is being used (YES in step S24), the controller 22 invokes the interface for performing image processing by using software. Thus, the CPU 20 executes the image processing S/W 44 serving as a plug-in, causing the image data generated through scanning to be subjected to image processing (in step S26).

The converter 24 converts the format of the image data which has been subjected to image processing into the format specified by the user (in step S27). Then, the controller 22 transfers the image data via the communication unit 34 and the communication path N to the external apparatus specified by the user (in step S28).

As described above, in the image processing apparatus 10A according to the second exemplary embodiment, when image processing is to be performed and even when the image processing H/W 42 which is the first-choice hardware used in the image processing is being used, the image processing S/W 44 serving as an alternative is used to perform image processing, achieving smooth image processing. If the image processing is caused to wait while the image processing H/W 42 is being used, the processing including the image processing may be delayed, causing a user to wait. In contrast, the image processing apparatus 10A according to the second exemplary embodiment achieves smooth image processing.

When the image processing H/W 42 is being used, the controller 22 may cause the image processing to wait until the use of the image processing H/W 42 is finished. After the use of the image processing H/W 42 is finished, the controller 22 may use the image processing H/W 42 to perform image processing on the image data generated through scanning. Thus, even in the case where the image processing S/W 44 which operates on the precondition that switching to an alternative is performed in response to the usage of the first-choice hardware is installed in the image processing apparatus 10A, image processing is performed using the image processing H/W 42. For example, when a time period for execution of processing which is caused to wait until use of the image processing H/W 42 is finished and which then performs image processing by using the image processing H/W 42 is less than that for execution of processing using the image processing S/W 44, the image processing H/W 42 may be used to perform image processing. Alternatively, when the amount of image data is equal to or more than a predetermined threshold, the image processing may be caused to wait until use of the image processing H/W 42 is finished, and image processing may be performed using the image processing H/W 42, not using the image processing S/W 44.

When the image processing H/W 42 is being used, the controller 22 may stop image processing, preventing the processing from being delayed.

Each of the functions of the controller 22 and the converter 24 included in the image processing apparatuses 10 and 10A described above is achieved typically with the CPU 20 executing programs stored in a storage such as the memory 30. However, some of the functions may be achieved through hardware. The above-described programs are stored in the storage through a recording medium, such as a CD or a DVD, or through a communication path such as a network. The above-described programs may be stored in advance in the storage. The programs stored in the storage are read out into a memory and executed by the CPU 20, achieving the functions of the above-described units.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a storage configured to store an additional program having an interface configured to switch processing using first-choice hardware to processing using an alternative to the first-choice hardware depending on usage of the first-choice hardware; and
a controller that, in response to processing related to the additional program being executed, is configured to execute the processing related to the additional program on image data by using the first-choice hardware or the alternative depending on the usage of the first-choice hardware,
wherein the addition, program is a program configured to transfer the image data to an external apparatus,
wherein the first-choice hardware is a first storage, and the alternative is a second storage having a data transfer rate that is lower than a data transfer rate of the first storage, and
wherein in response to the first storage having a sufficient available data capacity to transfer the image data, the controller is configured to store the image data in the first storage, and execute the additional program so as to transfer the image data stored in the first storage to the external apparatus, and
wherein, in response to the first storage not having the sufficient available data capacity to transfer the image data, the controller is configured to store the image data in the second storage, and execute the additional program so as to transfer the image data stored in the second storage to the external apparatus.

2. The image processing apparatus according to claim 1, further comprising:
an image reading unit configured to generate the image data by scanning a document.

3. The image processing apparatus according to claim 1, wherein the controller is further configured to transfer the image data to the external apparatus by using the first storage or the second storage depending a priority level associated with a user of the image processing apparatus.

4. The image processing apparatus according to claim 1, wherein, in response to the first storage not having the sufficient available data capacity transfer the image data and the image processing apparatus not including the second storage serving as the alternative, the controller is configured to wait until the sufficient available data capacity exists in the first storage, and use the first storage to transfer the image data to the external apparatus after the sufficient available data capacity exists in the first storage.

5. The image processing apparatus according to claim 3, wherein, in response to the first storage not having the sufficient available data capacity to transfer the image data and the image processing apparatus not including the second storage serving as the alternative, the controller is configured to wait until the sufficient available data capacity exists in the first storage, and use the first storage to transfer the image data to the external apparatus after the sufficient available data capacity exists in the first storage.

6. The image processing apparatus according to claim 1, wherein, in response to the first storage not having the sufficient available data capacity to transfer the image data and the image processing apparatus not including the second storage serving as the alternative, the controller is configured to stop the scanning and the transfer.

7. The image processing apparatus according to claim 3, wherein, in response to the first storage not having the sufficient available data capacity to transfer the image data and the image processing apparatus not including the second storage serving as the alternative, the controller is configured to stop the scanning and the transfer.

8. The image processing apparatus according to claim 1, wherein the first storage is a memory, and the second storage is a hard disk drive.

9. The image processing apparatus according to claim 3, wherein the first storage is a memory, and the second storage is a hard disk drive.

10. The image processing apparatus according to claim 4, wherein the first storage is a memory, and the second storage is a hard disk drive.

11. The image processing apparatus according to claim 5, wherein the first storage is a memory, and the second storage is a hard disk drive.

12. The image processing apparatus according to claim 6, wherein the first storage is a memory, and the second storage is a hard disk drive.

13. The image processing apparatus according to claim 7, wherein the first storage is a memory, and the second storage is a hard disk drive.

14. An image processing apparatus comprising:
a storage configured to store an additional program having an interface configured to switch processing using first-choice hardware to processing using an alternative to the first-choice hardware depending on usage of the first-choice hardware; and
a controller that, in response to processing related to the additional program being executed, is configured to execute the processing related to the additional program on image data by using the first-choice hardware or the alternative depending on the usage of the first-choice hardware,
wherein the additional program is an image processing program configured to perform predetermined image processing on the image data,
wherein the first-choice hardware is image-processing dedicated hardware configured to perform the predetermined image processing on the image data, and
wherein, in response to the image-processing dedicated hardware not being busy, the controller is configured to perform the predetermined image processing on the image data by using the image-processing dedicated hardware, and
wherein, in response to the image-processing dedicated hardware being busy, the controller is configured to perform the predetermined image processing on the image data by executing the image processing program.

15. A non-transitory computer readable medium storing a program causing a computer to execute a process, the program having an interface configured to switch processing using first-choice hardware to processing using an alternative to the first-choice hardware depending on usage of the first-choice hardware, the process comprising:
in response to processing related to an additional program added to an image processing apparatus being executed, switching a unit to be used in the execution of the processing related to the additional program to the first-choice hardware or the alternative depending on the usage of the first-choice hardware; and
using the first-choice hardware or the alternative to execute the processing related to the additional program on image data, the first-choice hardware or the alternative being the unit to which the switching has been performed,
wherein the additional program added to the image processing apparatus is a program configured transfer the image data to an external apparatus,
wherein the first-choice hardware is a first storage, and the alternative is a second storage having a data transfer ate that is lower than a data transfer rate of the first storage, and
wherein, in response to the first storage having a sufficient available data capacity to transfer the image data, the image data is stored in the first storage, and the additional program is executed on as to transfer the image data stored in the first storage to the external apparatus, and
wherein, in response to the first storage not having the sufficient available data capacity to transfer the image data, the image data is stored in the second storage, and the additional program is executed so as to transfer the image data stored in the second storage to the external apparatus.

16. An image processing method using a program having an interface configured to switch processing using first-choice hardware to processing using an alternative to the first-choice hardware depending on usage of the first-choice hardware, the method comprising:
in response to processing related to an additional program added to an image processing apparatus being executed, switching a unit to be used in the execution of the processing related to the additional program to the first-choice hardware or the alternative depending on the usage of the first-choice hardware; and using the first-choice hardware or the alternative to execute the processing related to the additional program on image data, the first-choice hardware or the alternative being the unit to which the switching has been performed, wherein the additional program added to the image processing apparatus is a program configured to transfer the image data to an external apparatus, wherein the first-choice hardware is a first storage, and the alternative is a second storage having a data transfer rate that is lower than a data transfer rate of the first storage, and wherein, in response to the first storage having a sufficient available data capacity to transfer the image data, the image data is stored in the first storage and the additional program is executed on as to transfer the image data stored in the first storage to the external apparatus, and wherein, in response to the first storage not having the sufficient available data capacity to transfer the image data, the i data is stored in the second storage, and the additional program is executed so as to transfer the image data stored in the second storage to the external apparatus.

17. An image processing apparatus comprising:

a storage configured to store an additional program having an interface configured to switch processing using first-choice hardware to processing using an alternative to the first-choice hardware depending on usage of the first-choice hardware; and a controller that, in response to processing related to the additional program being executed, is configured to execute the processing related to the additional program on image data by using the first-choice hardware or the alternative depending on the usage of the first-choice hardware, wherein the first-choice hardware is a first storage, and the alternative is a second storage having a data transfer rate that is lower than a data transfer rate of the first storage, and wherein, in response to the first storage having a sufficient available data capacity to process the image data, the controller is configured to store the image data in the first storage, and execute the additional program so as to process the image data stored in the first storage to the external apparatus, and wherein, in response to the first storage not having the sufficient available data capacity to process the image data, the controller is configured to store the image data in the second storage, and execute the additional program so as to process the image data stored in the second storage to the external apparatus.

18. A non-transitory computer readable medium storing a program causing a computer to execute a process, the program having an interface configured to switch processing using first-choice hardware to processing using an alternative to the first-choice hardware depending on usage of the first-choice hardware, the process comprising:

in response to processing related to an additional program added to an image processing apparatus being executed, switching a unit to be used in the execution of the processing related to the additional program to the first-choice hardware or the alternative depending on the usage of the first-choice hardware; and using the first-choice hardware or the alternative to execute the processing related to the additional program on image data, the first-choice hardware or the alternative being the unit to which the switching has been performed, wherein the first-choice hardware is a first storage, and the alternative is a second storage having a data transfer rate that is lower than a data transfer rate of the first storage, and wherein, in response to the first storage having a sufficient available data capacity to process the image data, the image data is stored in the first storage, and the additional program is executed so as to process the image data stored in the first storage to the external apparatus, and wherein, in response to the first storage not having the sufficient available data capacity to process the image data, the image data is stored in the second storage, and the additional program is executed so as to process the image data stored in the second storage to the external apparatus.

19. An image processing method using a program having an interface configured to switch processing using first-choice hardware to processing using an alternative to the first-choice hardware depending on usage of the first-choice hardware, the method comprising:

in response to processing related to an additional program added to an image processing apparatus being executed, switching a unit to be used in the execution of the processing related to the additional program to the first-choice hardware or the alternative depending on the usage of the first-choice hardware; and using the first-choice hardware or the alternative to execute the processing related to the additional program on image data, the first-choice hardware or the alternative being the unit to which the switching has been performed, wherein the first-choice hardware is a first storage, and the alternative is a second storage having a data transfer rate that is lower than a data transfer rate of the first storage, and wherein, in response to the first storage having a sufficient available data capacity to process the image data, the image data is stored in the first storage, and the additional program is executed so as to process the image data stored in the first storage to the external apparatus, and wherein, in response to the first storage not having the sufficient available data capacity to process the image data, the image data is stored in the second storage, and the additional program is executed so as to process the image data stored in the second storage to the external apparatus.

* * * * *